United States Patent
Shi et al.

(10) Patent No.: US 11,576,071 B2
(45) Date of Patent: *Feb. 7, 2023

(54) METHOD FOR DETERMINING TRIGGER STATE, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 35 days.

This patent is subject to a terminal disclaimer.

(21) Appl. No.: 17/354,335

(22) Filed: Jun. 22, 2021

(65) Prior Publication Data

US 2021/0314803 A1    Oct. 7, 2021

Related U.S. Application Data

(63) Continuation of application No. 17/003,849, filed on Aug. 26, 2020, now Pat. No. 11,082,875, which is a
(Continued)

(51) Int. Cl.
*H04W 24/10* (2009.01)
*H04W 72/04* (2009.01)

(52) U.S. Cl.
CPC ......... *H04W 24/10* (2013.01); *H04W 72/042* (2013.01)

(58) Field of Classification Search
CPC .. H04W 24/10; H04W 72/042; H04L 1/0023; H04B 7/0626
See application file for complete search history.

(56) References Cited

U.S. PATENT DOCUMENTS

| 2013/0142134 A1 | 6/2013 | Zhu |
| 2013/0242902 A1 | 9/2013 | Xiao et al. |

(Continued)

FOREIGN PATENT DOCUMENTS

| CN | 101908951 A | 12/2010 |
| CN | 101917259 A | 12/2010 |

(Continued)

OTHER PUBLICATIONS

Ericsson. 3GPP TSG RAN WG1 Meeting #92bis, R1-1804972, Apr. 16, 2018 (Apr. 16, 2018), pp. 1-3.
(Continued)

*Primary Examiner* — Walli Z Butt
*Assistant Examiner* — Thad N Defauw
(74) *Attorney, Agent, or Firm* — Perkins Coie LLP

(57) ABSTRACT

Provided in embodiments of the present application are a method and apparatus for determining trigger state, a terminal device, and a communication device; the method comprises: a terminal device receiving first configuration information sent by a network device, the first configuration information comprising configuration information of at least one trigger state; the terminal device receiving first control information sent by the network device, the first control information comprising a first information domain; the terminal device determining a first trigger state identifier on the basis of the value of the first information domain, and determining a corresponding first trigger state in the first configuration information on the basis of the first trigger state identifier; or, the terminal device determining a first trigger state at a target position in the first configuration information on the basis of the value of the first information domain.

6 Claims, 4 Drawing Sheets

Related U.S. Application Data continuation of application No. PCT/CN2018/108003, filed on Sep. 27, 2018.

(56) References Cited

U.S. PATENT DOCUMENTS

2017/0359746 A1 12/2017 Lee et al.
2018/0123668 A1 5/2018 Kwak et al.
2019/0349119 A1 11/2019 Nammi et al.

FOREIGN PATENT DOCUMENTS

| CN | 102404085 A | 4/2012 |
|---|---|---|
| CN | 101917259 B | 6/2016 |
| CN | 106549734 A | 3/2017 |
| CN | 107733595 A | 2/2018 |
| JP | 2017175628 A | 9/2017 |
| RU | 2638567 C1 | 12/2017 |

OTHER PUBLICATIONS

International Search Report in the international application No. PCT/CN2018/108003, dated Jun. 27, 2019.
Written Opinion of the International Search Authority in the international application No. PCT/CN2018/108003, dated Jun. 27, 2019.
"3rd Generation Partnership Project; Technical Specification Group Radio Access Network; NR; Physical layer procedures for data(Release 15)", 3GPP TS 38.214 V15.3.0 (Sep. 2018), 3rd Generation Partnership Project (3GPP), Mobile Competence Centre; 650, Route Des Lucioles; F-06921 Sophiaantipolis Cedex; France, Sep. 26, 2018 (Sep. 26, 2018), XP051515404.
Huawei et al.: "Corrections on CSI-MeasConfig and CSI-ReportConfig", 3GPP Draft; R2-1805327, 3rd Generation Partnership Project (3GPP), Mobile Competence Centre; 650, Route Des Lucioles; F-06921 Sophia-Antipolis Cedex; FRANCE vol. RAN WG2, no. Sanya, China; Apr. 14, 2018 (Apr. 14, 2018), XP051429001.
Ericsson: "CSI framework simplification", 3GPP Draft; R1-1802740 CSI Framework Simplification, 3rd Generation Partnership Project (3GPP), Mobile Competence Centre; 650, Route Des Lucioles; F-06921 Sophia-Antipolis Cedex: FRANCEvol. RAN WG1, no. Athens, Greece; Feb. 26, 2018-Mar. 2, 2018 Feb. 17, 2018 (Feb. 17, 2018), XP051398172.
Supplementary European Search Report in the European application No. 18935258.6, dated Apr. 13, 2021.
Non-Final Office Action of the U.S. Appl. No. 17/003,849, dated Dec. 8, 2020.
Notice of Allowance of the U.S. Appl. No. 17/003,849, dated Mar. 31, 2021.
First Office Action of the Chinese application No. 202010456022.4, dated Jun. 2, 2021.
First Office Action of the Japanese application No. 2020-559557, dated Jul. 8, 2022. 8 pages with English translation.
First Office Action of the European application No. 18935258.6, dated Dec. 7, 2021. 5 pages.
First Office Action of the Russian application No. 2020137927, dated Dec. 29, 2021. 11 pages with English translation.
Office Action of the Indian application No. 202017047868, dated Dec. 21, 2021. 7 pages with English translation.
First Office Action of the Canadian application No. 3098506, dated Oct. 22, 2021. 5 pages.
First Office Action of the Taiwanese application No. 108135353, dated Sep. 19, 2022. 10 pages with English translation.
Second Office Action of the Canadian application No. 3098506, dated Oct. 6, 2022. 5 pages.
Third Office Action of the European application No. 18935258.6, dated Oct. 5, 2022. 5 pages.
Written Opinion of the Singaporean application No. 11202010517P, dated Oct. 31, 2022. 10 pages.
NTT Docomo "Maintenance for CSI acquisition" 3GPP TSG RAN WG1 Meeting #94 R1-1809137, Gothenburg, Sweden, Aug. 20-24, 2018. 8 pages.
Second Office Action of the Japanese application No. 2020-559557, dated Nov. 18, 2022. 8 pages with English translation.

METHOD FOR DETERMINING TRIGGER STATE, TERMINAL DEVICE, AND NETWORK DEVICE

CROSS REFERENCE TO RELATED APPLICATION

This application is a continuation application of U.S. patent application Ser. No. 17/003,849, filed Aug. 26, 2020, which is a continuation of International application No. PCT/CN2018/108003, filed on Sep. 27, 2018 and entitled "METHOD AND APPARATUS FOR DETERMINING TRIGGER STATE, TERMINAL, AND NETWORK DEVICE", the disclosures of which are hereby incorporated by reference in their entirety.

TECHNICAL FIELD

The disclosure relates to the technical field of mobile communications, and in particular to a method for determining a triggering state, a terminal device, and a network device.

BACKGROUND

In a new radio (NR) system, reporting operation of a terminal device include periodic reporting, aperiodic (AP) reporting and semi-persistent (SP) reporting. both the AP reporting and the SP reporting can be triggered by downlink control information (DCI), and reported content is transmitted through a physical uplink shared channel (PUSCH).

In order to complete the DCI-based reporting trigger mechanism as described above, the following are designed in the NR system: 1) a channel state information (CSI) triggering state list, and 2) a specific field in the DCI, called a CSI request field. In order to trigger reporting, a correspondence relation from a triggering state to a codepoint of a CSI request field needs to be determined, and how to determine the correspondence relation is a problem to be solved.

DETAILED DESCRIPTION OF THE DRAWINGS

The accompanying drawings are described here to provide further understanding of the disclosure and constitute part of the disclosure. Exemplary embodiments of the disclosure and description thereof are for the purpose of explanation, and do not for inappropriate limitation to the disclosure. In the drawings.

DETAILED DESCRIPTION

The technical solutions according to embodiments of the disclosure will be described hereinbelow in conjunction with the accompanying drawings in the embodiments of the disclosure. Apparently, the described embodiments are merely some of the embodiments rather than all embodiments of the disclosure. Based on the embodiments of the disclosure, all other embodiments obtained by those of ordinary skill in the art without making any inventive effort shall fall within the protection scope of the disclosure.

The technical solutions according to embodiments of the disclosure may be applied to various communication systems, for example, a global system for mobile communication (GSM) system, a code division multiple access (CDMA) system, a wideband code division multiple access (WCDMA) system, a general packet ratio service (GPRS) system, a long term evolution (LTE) system, an LTE frequency division duplex (FDD) system, an LTE time division duple (TDD) system, and a universal mobile telecommunication system (UMTS), a worldwide interoperability for microwave access (WiMAX) communication system or a 5G system.

Figure 1:
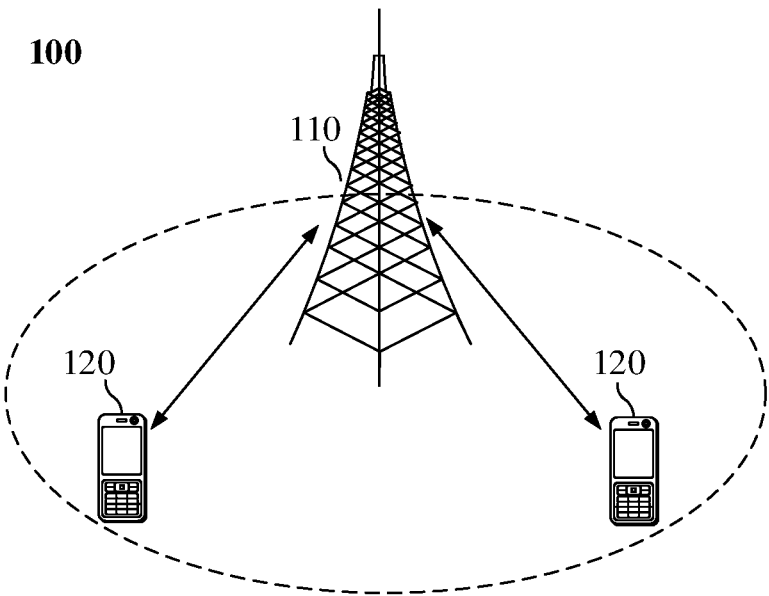
FIG. 1 illustrates a schematic diagram of a communication system architecture according to some embodiments of the disclosure.

Exemplarily, a communication system 100 to which the embodiments of the disclosure are applied is illustrated in FIG. 1. The communication system 100 may include a network device 110, and the network device 110 may be a device communicating with a terminal device 120 (or called a communication terminal or terminal). The network device 110 can provide communication coverage for a specific geographical area, and can communicate with a terminal device within the covered area. The network device 110 may be a base transceiver station (BTS) in a GSM system or CDMA system, a NodeB (NB) in a WCDMA system, an evolutional NodeB (eNB or eNodeB) in an LTE system, or a radio controller in a cloud radio access network (CRAN). The network device may also be a mobile switching center, a relay station, an access point, a vehicle-mounted device, a wearable device, a hub, a switch, a bridge, a router, a network-side device in a 5G network, a network device in a future evolved public land mobile network (PLMN) or the like.

The communication system 100 further includes at least one terminal device 120 within the coverage of the network device 110. "Terminal device" as used here includes but is not limited to being connected via a wired line, for example, via a public switched telephone network (PSTN), a digital subscriber line (DSL), a digital cable, or a direct cable connection; and/or via another data connection/network; and/or via a wireless interface, for example for a cellular network, a wireless local area network (WLAN), a digital telephone network such as a DVB-H network, a satellite network, or an AM-FM broadcast transmitter; and/or via a device of another terminal device configured to receive/send a communication signal; and/or via an Internet of things (IoT) device.

A terminal device configured to communicate via a wireless interface may be called a "wireless communication terminal", a "wireless terminal" or a "mobile terminal". Examples of a mobile terminal include but are not limited to: a satellite phone or a cell phone; a personal communication system (PCS) terminal which can combine a cellular radio phone with data processing, faxing and data communication capabilities; a personal digital assistant (PDA) that may include a radio phone, a pager, Internet/intranet access, a Web browser, a notebook, a calendar and/or a global positioning system (GPS) receiver; a conventional laptop and/or handheld receiver; or other electronic devices including a radio telephone transceiver.

The terminal device may be an access terminal, a user equipment (UE), a subscriber unit, a user station, a mobile station, a remote station, a remote terminal, a mobile device, a user terminal, a wireless communication device, a user agent or a user device. The access terminal may be a cell phone, a cordless phone, a session initiation protocol (SIP) phone, a wireless local loop (WLL) station, a personal digital assistant (PDA), a hand-held device with a wireless communication function, a computing device or other processing devices connected to a wireless modem, a vehicle-mounted device, a wearable device, a terminal device in a 5G network, a terminal device in a future evolved PLMN or the like.

Terminal devices 120 may communicate with each other through device to device (D2D) communication.

A 5G system or a 5G network may also be called a new radio (NR) system or an NR network.

FIG. 1 illustrates a network device and two terminal devices in an exemplary way. The communication system 100 may include multiple network devices, and there may be another number of terminal devices within the coverage of each of the terminal devices, which will not be limited in embodiments of the disclosure.

The communication system 100 may further include other network entities such as a network controller, and a mobility management entity, which will not be limited in embodiments of the disclosure.

It is to be understood that a device with a communication function in a network/system in embodiments of the disclosure may be called a communication device. With the communication system 100 illustrated in FIG. 1 as an example, the communication devices may include a network device 110 and a terminal device 120, each having a communication function. The network device 110 and the terminal device 120 may be the specific devices as described above, which will not be described here. The communication devices may further include other devices in the communication system 100, for example, other network entities such as a network controller, and a mobility management entity, which will not be limited in embodiments of the disclosure.

It is to be understood that terms "system" and "network" used here are often used interchangeably. The term "and/or" is used here to describe association relations between associated objects, and three relations may be indicated. For example, A and/or B may indicate three situations: A exists alone, both A and B exist at the same time, and B exists alone. In addition, the character "/" here generally indicates an "or" relation between associated objects before and after the character.

A method and device for determining a triggering state, a terminal device, and a network device are provided in embodiments of the disclosure.

A method for determining a triggering state provided in embodiments of the disclosure includes: receiving, by a terminal device, first configuration information from a network device, wherein the first configuration information includes configuration information of at least one triggering state; and receiving, by the terminal device, first control information from the network device, wherein the first control information includes a first information field. The method further includes: determining, by the terminal device, based on a codepoint of the first information field, a first triggering state identification (ID), and determining, based on the first triggering state ID, a corresponding first triggering state in the first configuration information; or determining, by the terminal device, based on the codepoint of the first information field, the first triggering state at a target position in the first configuration information.

A method for determining a triggering state provided in embodiments of the disclosure includes: sending, by a network device, first configuration information to a terminal device, wherein the first configuration information includes configuration information of at least one triggering state; and sending, by the network device, first control information to the terminal device, wherein the first control information includes a first information field. A codepoint of the first information field is used for the terminal device to determine a first triggering state identification (ID), and to determine, based on the first triggering state ID, a corresponding first triggering state in the first configuration information; or the codepoint of the first information field is used for the terminal device to determine the first triggering state at a target position in the first configuration information.

A device for determining a triggering state includes: a first receiving unit, configured to receive first configuration information from a network device, wherein the first configuration information includes configuration information of at least one triggering state; a second receiving unit, configured to receive first control information from the network device, wherein the first control information includes a first information field; and a determination unit, configured to determine, based on a codepoint of the first information field, a first triggering state identification (ID), and determine, based on the first triggering state ID, a corresponding first triggering state in the first configuration information; or configured to determine, based on the codepoint of the first information field, the first triggering state at a target position in the first configuration information.

A device for determining a triggering state includes: a first sending unit, configured to send first configuration information to a terminal device, wherein the first configuration information includes configuration information of at least one triggering state; and a second sending unit, configured to send first control information to the terminal device, wherein the first control information includes a first information field. A codepoint of the first information field is used for the terminal device to determine a first triggering state identification (ID), and to determine, based on the first triggering state ID, a corresponding first triggering state in the first configuration information; or the codepoint of the first information field is used for the terminal device to determine the first triggering state at a target position in the first configuration information.

A terminal device provided in embodiments of the disclosure includes a processor and a memory for storing a computer program. The processor is configured to call and run the computer program stored in the memory, to perform the above method for determining a triggering state.

A network device provided in embodiments of the disclosure includes a processor and a memory for storing a computer program. The processor is configured to call and run the computer program stored in the memory, to perform the above method for determining a triggering state.

A chip for implementing the above method for determining a triggering state is provided in embodiments of the disclosure. In particular, the chip includes a processor configured to call and run a computer program from a memory, to enable a device installed with the chip to perform the above method for determining a triggering state.

Provided in embodiments of the disclosure is a computer-readable storage medium for storing a computer program which enables a computer to perform the above method for determining a triggering state.

Provided in embodiments of the disclosure is a computer program product including computer program instructions which enable a computer to perform the above method for determining a triggering state.

Provided in embodiments of the disclosure is a computer program which, when running on a computer, enables the computer to perform the above method for determining a triggering state.

In the technical solutions above, a triggering state identification (ID) is defined for each triggering state, and a terminal device can determine a corresponding triggering state according to a correspondence relation between a codepoint of a CSI request field in DCI and a triggering state ID, so as to realize a reporting operation corresponding to the triggering state. The terminal device can also directly determine the corresponding triggering state according to a correspondence relation between the codepoint of the CSI request field in DCI and a position of the triggering state, so as to realize a reporting operation corresponding to the triggering state. Due to the correspondence relation between the codepoint of the CSI request field and the triggering state ID or the position of the triggering state, a network side can trigger a reporting operation of the terminal device by using the DCI.

To better understand the technical solutions according to embodiments of the disclosure, related techniques involved in the embodiments of the disclosure are explained below.

1. CSI Triggering State List

There are two types of CSI triggering state lists: a CSI triggering state list corresponding to aperiodic (AP) reporting (called a CSI-AperiodicTriggerStateList), and a CSI triggering state list corresponding to semi-persistent (SP) reporting (called a CSI-SemiPersistentOnPUSCH-TriggerStateList).

In the definition of the CSI-AperiodicTriggerStateList, configuration information for each aperiodic triggering state is defined. In the definition of the CSI-SemiPersistentOnPUSCH-TriggerStateList, configuration information for each semi-persistent triggering state is defined. Here, the configuration information of each triggering state may include but is not limited to: what information to measure, what information to report, a way of information reporting, etc.

2. CSI Request Field

The CSI request field is a specific information field in DCI. A codepoint of the CSI request field is a value of the CSI request field. For example, if the CSI request field consists of two bits, a codepoint of the CSI request field may be 00, 01, 10, or 11.

In an NR system, AP reporting and SP reporting may be triggered by DCI. In particular, a correspondence relation between codepoints of a CSI request field in the DCI and triggering states needs to be determined. That is to say, after detecting a codepoint of the CSI request field, a user equipment (UE) needs to know which triggering state the codepoint corresponds to.

3. A Relation Between Triggering States and Codepoints of the CSI Request Field

For aperiodic reporting, all-zero codepoints correspond to no aperiodic reporting. Therefore, a starting codepoint corresponding to a triggering state is 1.

For semi-persistent reporting, a starting codepoint corresponding to a triggering state is 0.

In order to realize correspondence (also called mapping) between codepoints and triggering states, a particular mapping scheme is provided in the embodiments of the disclosure.

Figure 2:
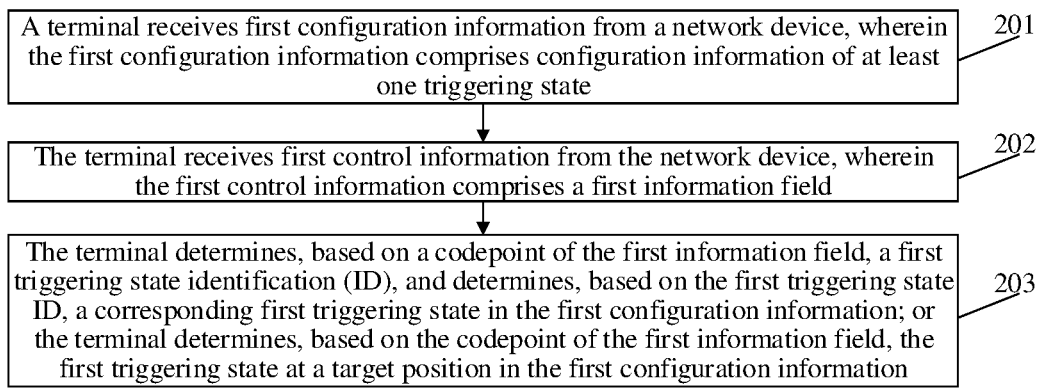
FIG. 2 illustrates a first schematic flow chart of a method for determining a triggering state according to some embodiments of the disclosure.

FIG. 2 illustrates a first schematic flow chart of a method for determining a triggering state according to some embodiments of the disclosure. As illustrated in FIG. 2, the method for determining a triggering state includes actions 201, 202 and 203.

In action 201, a terminal device receives first configuration information from a network device. The first configuration information includes configuration information of at least one triggering state.

In embodiments of the disclosure, the terminal device may be any device capable of communicating with a network, such as a mobile phone, a tablet, a vehicle-mounted terminal device and a notebook.

In embodiments of the disclosure, the network device is a base station, for example a gNB in a 5G network, and an eNB in a 4G network.

In embodiments of the disclosure, the first configuration information is transmitted via high-level signalling. The high-level signalling is radio resource control (RRC) signalling.

In embodiments of the disclosure, the first configuration information includes configuration information of at least one triggering state. Further, the first configuration information may be RRC signalling for configuring a CSI-AperiodicTriggerStateList, or an RRC signalling for configuring a CSI-SemiPersistentOnPUSCH-TriggerStateList.

The first configuration information includes configuration information of one or more triggering states. Generally, the first configuration information includes configuration information of multiple triggering states. The configuration information of each triggering state may include but is not limited to: what information to measure, what information to report, a way of information reporting, etc.

In action 202, the terminal device receives first control information from the network device. The first control information includes a first information field.

In a specific implementation, the first control information may be DCI. The first information field in the first control information may be called a CSI request field. Further, a value of the first information field is a codepoint of the CSI request field. For example, the first information field includes 3 bits, and a codepoint of the first information field may be: 000, 001, 010, 011, 100, 101, 110, or 111.

In action 203, the terminal device determines, based on a codepoint of the first information field, a first triggering state identification (ID), and determines, based on the first triggering state ID, a corresponding first triggering state in the first configuration information; or the terminal device determines, based on the codepoint of the first information field, the first triggering state at a target position in the first configuration information.

In embodiments of the disclosure, a codepoint of the first information field corresponds to a triggering state in the first configuration information. The correspondence relation may be determined in one of the following approaches.

Approach 1: configuration information of each of the at least one triggering state in the first configuration information includes a second information field. The second information field indicates a triggering state ID of the triggering state.

In particular, when the first configuration information is configuration information for aperiodic reporting, configuration information of each aperiodic triggering state includes the second information field. The second information field indicates a triggering state ID of the aperiodic triggering state. When the first configuration information is configuration information for semi-persistent reporting, configuration information of each semi-persistent triggering state includes the second information field. The second information field indicates a triggering state ID of the semi-consistent triggering state.

In a specific implementation, a triggering state ID (called a state ID) field (i.e., the second information field) may be added to RRC signalling carrying the first configuration information. The implementation of the state ID field is described in combination with first configuration information for aperiodic reporting and first configuration information for semi-persistent reporting respectively.

Please see table 1 in the below. Table 1 provides information of a CSI-AperiodicTriggerStateList, in which a state ID field labelled with an underline is added. It is to be noted that, in the configuration information of each CSI-AperiodicTriggerState, a corresponding state ID field is added, so as to indicate the state ID corresponding to the triggering state by the state ID field. The value of the state ID is of a type of numeric.

TABLE 1

```
-- ASN1START
-- TAG-CSI-APERIODICTRIGGERSTATELIST-START
CSI-AperiodicTriggerStateList ::=    SEQUENCE (SIZE (1..maxNrOfCSI-
AperiodicTriggers)) OF CSI-AperiodicTriggerState
CSI-AperiodicTriggerState ::=        SEQUENCE{
    stateID                          numeric
    associatedReportConfigInfoList   SEQUENCE
(SIZE(1..maxNrofReportConfigPerAperiodicTrigger)) OF CSI-
AssociatedReportConfigInfo,
    ...
}
CSI-AssociatedReportConfigInfo ::= SEQUENCE {
    reportConfigId                   CSI-ReportConfigId,
    resourcesForChannel              CHOICE {
        nzp-CSI-RS                       SEQUENCE {
            resourceSet                      INTEGER (1..maxNrofNZP-CSI-
RS-ResourceSetsPerConfig),
            qcl-info                         SEQUENCE
(SIZE(1..maxNrofAP-CSI-RS-ResourcesPerSet)) OF TCI-StateId OPTIONAL --
Cond Aperiodic
        },
        csi-SSB-ResourceSet              INTEGER (1..maxNrofCSI-SSB-
ResourceSetsPerConfig)
    },
    csi-IM-ResourcesForInterference    INTEGER(1..maxNrofCSI-IM-
ResourceSetsPerConfig)            OPTIONAL, -- Cond CSI-IM-ForInterference
    nzp-CSI-RS-ResourcesForInterference INTEGER (1..maxNrofNZP-CSI-RS-
ResourceSetsPerConfig)            OPTIONAL, -- Cond NZP-CSI-RS-ForInterference
    ...
}
-- TAG-CSI-APERIODICTRIGGERSTATELIST-STOP
-- ASN1STOP
```

Please see table 2 below. Table 2 provides information of a CSI-SemiPersistentOnPUSCH-TriggerStateList, in which a state ID field labelled with an underline is added. It is to be noted that, in the configuration information of each CSI-SemiPersistentOnPUSCH-TriggerState, a corresponding state ID field is added, so as to indicate the state ID corresponding to the triggering state by the state ID field. The value of the state ID is of a type of numeric.

TABLE 2

```
-- ASN1START
-- TAG-CSI-SEMIPERSISTENTONPUSCHTRIGGERSTATELIST-START
CSI-SemiPersistentOnPUSCH-TriggerStateList ::= SEQUENCE(SIZE
(1 ..maxNrOfSemiPersistentPUSCH-Triggers)) OF CSI-SemiPersistentOnPUSCH-
TriggerState
CSI-SemiPersistentOnPUSCH-TriggerState ::=        SEQUENCE {
    stateID                          numeric
    associatedReportConfigInfo       CSI-ReportConfigId,
    ...
}
--TAG-CSI-SEMIPERSISTENTONPUSCHTRIGGERSTATELIST-STOP
-- ASN1STOP
```

By the approach 1, the terminal device can determine, based on a codepoint of the first information field, a first triggering state ID, and determine, based on the first triggering state ID, a corresponding first triggering state in the first configuration information.

Approach 2: a position of each of the at least one triggering state in the first configuration information corresponds to a triggering state ID of the triggering state.

In particular, when the first configuration information is configuration information for aperiodic reporting, a position of each aperiodic triggering state in the first configuration information corresponds to a triggering state ID of the aperiodic triggering state. When the first configuration information is configuration information for semi-persistent reporting, a position of each semi-persistent triggering state in the first configuration information corresponds to a triggering state ID of the semi-persistent triggering state.

In an implementation, triggering state IDs of triggering states in the first configuration information are sorted in an ascending order from a first position to a last position for the triggering states.

In another implementation, the triggering state IDs of the triggering states in the first configuration information are sorted in a descending order from the first position to the last position for the triggering states.

In a specific implementation, RRC signalling carrying first configuration information may keep unchanged, and a triggering state ID is determined implicitly through a position of a triggering state. How to determine the triggering state ID implicitly is described in combination with first configuration information for aperiodic reporting and first configuration information for semi-persistent reporting respectively.

The first configuration information for aperiodic reporting contains a list, i.e., a CSI-AperiodicTriggerStateList, and a state ID corresponding to a triggering state may be determined according to a position of the triggering state in the first configuration information (i.e., the position in the RRC signalling). For example, a state ID corresponding to a first triggering state is 0, and a state ID corresponding to a second triggering state is 1, and so forth. Alternatively, state IDs are sorted in another order. For example, a state ID corresponding to the last triggering state is 0, and a state ID corresponding to the last but one triggering state is 1, and so forth.

Similarly, the first configuration information for semi-persistent reporting contains a list, i.e., a CSI-SemiPersistentOnPUSCH-TriggerStateList, and a state ID corresponding to a triggering state may be determined according to a position of the triggering state in the first configuration information (i.e., the position in the RRC signalling). For example, a state ID corresponding to a first triggering state is 0, and a state ID corresponding to a second triggering state is 1, and so forth. Alternatively, state IDs are sorted in another order. For example, a state ID corresponding to the last triggering state is 0, and a state ID corresponding to the last but one triggering state is 1, and so forth.

For semi-persistent reporting, there is another implicit way of determining a state ID, that is, determining a state ID according to a CSI-ReportConfigId. In particular, configuration information of each triggering state in first configuration information for semi-persistent reporting includes a reporting configuration identification (i.e., a CSI-ReportConfigId), and thus the CSI-ReportConfigId may be directly used as a state ID to distinguish different triggering states.

By the approach 2, the terminal device can determine, based on a codepoint of the first information field, a first triggering state ID, and determine, based on the first triggering state ID, a corresponding first triggering state in the first configuration information.

Approach 3: a position of each of the at least one triggering state in the first configuration information corresponds to a codepoint of the first information field.

In particular, when the first configuration information is configuration information for aperiodic reporting, a position of each aperiodic triggering state in the first configuration information corresponds to a codepoint of the first information field. When the first configuration information is configuration information for semi-persistent reporting, a position of each semi-persistent triggering state in the first configuration information corresponds to a codepoint of the first information field.

In an implementation, codepoints of the first information field correspond in an ascending order to triggering states from a first position to a last position for the triggering states in the first configuration information.

In another implementation, the codepoints of the first information field correspond in a descending order to triggering states from the first position to the last position for the triggering states in the first configuration information.

In a specific implementation, RRC signalling carrying first configuration information may keep unchanged, and a triggering state is determined implicitly by a position of the triggering state. How to determine the triggering state implicitly is described in combination with first configuration information for aperiodic reporting and first configuration information for semi-persistent reporting respectively.

First configuration information for aperiodic reporting contains a list, i.e., a CSI-AperiodicTriggerStateList. A correspondence relation between non-zero codepoints and triggering states is determined based on the order of positions of the triggering states in the list. For example, a codepoint '1' corresponds to a triggering state at a first position, a codepoint '2' corresponds to a triggering state at a second position, and so forth. Alternatively, the correspondence relation is defined in a reversed order. For example, a codepoint '1' corresponds to a triggering state at the last position, and a codepoint '2' corresponds to a triggering state at the last but one position.

Similarly, first configuration information for semi-persistent reporting contains a list, i.e., a CSI-SemiPersistentOnPUSCH-TriggerStateList. A correspondence relation between codepoints and triggering states is determined based on the order of positions of the triggering states in the list. For example, a codepoint '1' corresponds to a triggering state at a first position, a codepoint '2' corresponds to a triggering state at a second position, and so forth. Alternatively, the correspondence relation is defined in a reversed order. For example, a codepoint '1' corresponds to a triggering state at the last position, and a codepoint '2' corresponds to a triggering state at the last but one position.

By the approach 3, the terminal device can determine, based on a codepoint of the first information field, a first triggering state at a target position in the first configuration information. Here, the target position corresponds to the codepoint of the first information field.

Approach 4: when the first configuration information is configuration information for semi-persistent reporting, configuration information of each semi-persistent triggering state in the first configuration information includes a reporting configuration ID, and the reporting configuration ID corresponds to a codepoint of the first information field.

In an implementation, reporting configuration IDs correspond in an ascending order to codepoints of the first information field.

In another implementation, the reporting configuration IDs correspond in a descending order to the codepoints of the first information field.

In a specific implementation, RRC signalling carrying first configuration information may keep unchanged, and a triggering state is determined implicitly by a reporting configuration ID (i.e., a CSI-ReportConfigId) corresponding to the triggering state. In particular, for semi-persistent reporting, each of the at least one triggering state is configured with only one CSI-ReportConfigId (i.e., an ID corresponding to CSI reporting configuration), and the CSI-ReportConfigId is directly used to correspond to a codepoint of the CSI request field. A correspondence relation between codepoints to triggering states is determined based on the order of CSI-ReportConfigIds corresponding to the triggering states. For example, a codepoint '0' corresponds to the minimum CSI-ReportConfigId, and a codepoint '1' corresponds to the second minimum CSI-ReportConfigId. Alternatively, the correspondence relation is defined in a reversed order. For example, a codepoint '0' corresponds to the maximum CSI-ReportConfigId, and a codepoint '1' corresponds to the second maximum CSI-ReportConfigId.

By the approach 4, the terminal device can determine, based on a codepoint of the first information field, a corresponding reporting configuration ID, and determine, based on the reporting configuration ID, a corresponding first triggering state.

Figure 3:
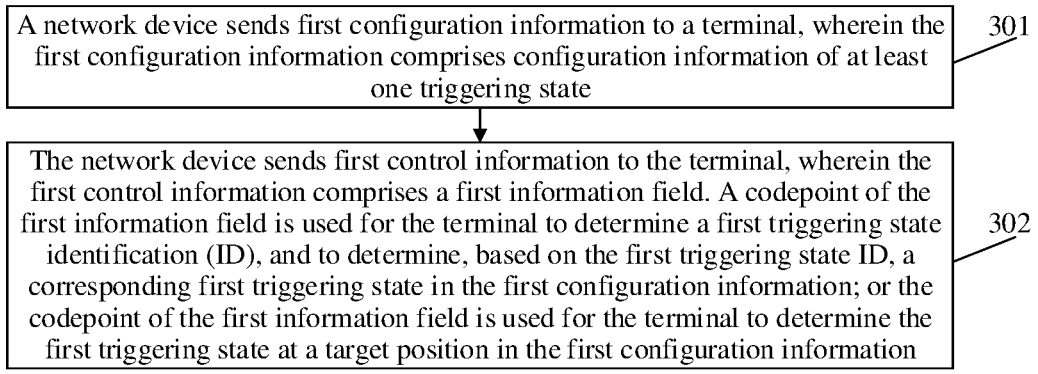
FIG. 3 illustrates a second schematic flow chart of a method for determining a triggering state according to some embodiments of the disclosure.

FIG. 3 illustrates a second schematic flow chart of a method for determining a triggering state according to some embodiments of the disclosure. As illustrated in FIG. 3, the method for determining a triggering state includes actions 301 and 302.

In action 301, a network device sends first configuration information to a terminal device. The first configuration information includes configuration information of at least one triggering state.

In embodiments of the disclosure, the network device is a base station, for example a gNB in a 5G network, and an eNB in a 4G network.

In embodiments of the disclosure, the terminal device may be any device capable of communicating with a network, such as a mobile phone, a tablet, a vehicle-mounted terminal device and a notebook.

In embodiments of the disclosure, the first configuration information is transmitted via high-level signalling. The high-level signalling is RRC signalling.

In embodiments of the disclosure, the first configuration information includes configuration information of at least one triggering state. Further, the first configuration information may be RRC signalling for configuring a CSI-AperiodicTriggerStateList, or RRC signalling for configuring a CSI-SemiPersistentOnPUSCH-TriggerStateList.

The first configuration information includes configuration information of one or more triggering states. Generally, the first configuration information includes configuration information of multiple triggering states. The configuration information of each triggering state may include but is not limited to: what information to measure, what information to report, a way of information reporting, etc.

In action 302, the network device sends first control information to the terminal device. The first control information includes a first information field. A codepoint of the first information field is used for the terminal device to determine a first triggering state identification (ID), and to determine, based on the first triggering state ID, a corresponding first triggering state in the first configuration information; or the codepoint of the first information field is used for the terminal device to determine the first triggering state at a target position in the first configuration information.

In a specific implementation, the first control information may be DCI. The first information field in the first control information may be called a CSI request field. Further, a value of the first information field is a codepoint of the CSI request field. For example, the first information field includes 3 bits, and a value of the first information field may be: 000, 001, 010, 011, 100, 101, 110, or 111.

In embodiments of the disclosure, a codepoint of the first information field corresponds to a triggering state in the first configuration information. The correspondence relation may be determined in one of the following approaches.

Approach 1: configuration information of each of the at least one triggering state in the first configuration information includes a second information field. The second information field indicates a triggering state ID of the triggering state.

In particular, when the first configuration information is configuration information for aperiodic reporting, configuration information of each aperiodic triggering state includes the second information field. The second information field indicates a triggering state ID of the aperiodic triggering state. When the first configuration information is configuration information for semi-persistent reporting, configuration information of each semi-persistent triggering state includes the second information field. The second information field indicates a triggering state ID of the semi-consistent triggering state.

In a specific implementation, a triggering state identification (called a state ID) field (i.e., the second information field) may be added to an RRC signalling carrying the first configuration information. The implementation of the state ID field is described in combination with first configuration information for aperiodic reporting and first configuration information for semi-persistent reporting.

Approach 2: a position of each of the at least one triggering state in the first configuration information corresponds to a triggering state ID of the triggering state.

In particular, when the first configuration information is configuration information for aperiodic reporting, a position of each aperiodic triggering state in the first configuration information corresponds to a triggering state ID of the aperiodic triggering state. When the first configuration information is configuration information for semi-persistent reporting, a position of each semi-persistent triggering state in the first configuration information corresponds to a triggering state ID of the semi-persistent triggering state.

In an implementation, triggering state IDs of triggering states in the first configuration information are sorted in an ascending order from a first position to a last position for the triggering states.

In another implementation, the triggering state IDs of the triggering states in the first configuration information are sorted in a descending order from the first position to the last position for the triggering states.

In a specific implementation, RRC signalling carrying first configuration information may keep unchanged, and a triggering state ID is determined implicitly by a position of a triggering state. How to determine the triggering state ID implicitly is described in combination with first configuration information for aperiodic reporting and first configuration information for semi-persistent reporting respectively.

The first configuration information for aperiodic reporting contains a list, which is a CSI-AperiodicTriggerStateList, and a state ID corresponding to a triggering state may be determined according to a position of the triggering state in the first configuration information (i.e., the position in the RRC signalling). For example, a state ID corresponding to a first triggering state is 0, and a state ID corresponding to a second triggering state is 1, and so forth. Alternatively, state IDs are sorted in a reversed order. For example, a state ID corresponding to the last triggering state is 0, and a state ID corresponding to the last but one triggering state is 1, and so forth.

Similarly, the first configuration information for semi-persistent reporting contains a list, i.e., a CSI-SemiPersistentOnPUSCH-TriggerStateList, and a state ID corresponding to a triggering state may be determined according to a position of the triggering state in the first configuration information (i.e., the position in the RRC signalling). For example, a state ID corresponding to a first triggering state is 0, and a state ID corresponding to a second triggering state is 1, and so forth. Alternatively, state IDs are sorted in a reversed order. For example, a state ID corresponding to the last triggering state is 0, and a state ID corresponding to the last but one triggering state is 1, and so forth.

For semi-persistent reporting, there is another implicit way of determining a state ID, that is, determining a state ID according to a CSI-ReportConfigId. In particular, configuration information of each triggering state in first configuration information for semi-persistent reporting includes a reporting configuration identification (i.e., a CSI-ReportConfigId), and thus the CSI-ReportConfigId may be directly used as a state ID to distinguish different triggering states.

Approach 3: a position of each of the at least one triggering state in the first configuration information corresponds to a codepoint of the first information field.

In particular, when the first configuration information is configuration information for aperiodic reporting, a position of each aperiodic triggering state in the first configuration information corresponds to a codepoint of the first information field. When the first configuration information is configuration information for semi-persistent reporting, a position of each semi-persistent triggering state in the first configuration information corresponds to a codepoint of the first information field.

In an implementation, codepoints of the first information field correspond in an ascending order to triggering states from a first position to a last position for the triggering states in the first configuration information.

In another implementation, the codepoints of the first information field correspond in a descending order to triggering states from the first position to the last position for the triggering states in the first configuration information.

In a specific implementation, RRC signalling carrying first configuration information may keep unchanged, and a triggering state is determined implicitly by a position of the triggering state. How to determine the triggering state implicitly is described in combination with first configuration information for aperiodic reporting and first configuration information for semi-persistent reporting respectively.

First configuration information for aperiodic reporting contains a list, which is a CSI-AperiodicTriggerStateList. A correspondence relation between non-zero codepoints and triggering states is determined based on the order of positions of the triggering states in the list. For example, a codepoint '1' corresponds to a triggering state at a first position, a codepoint '2' corresponds to a triggering state at a second position, and so forth. Alternatively, the correspondence relation is defined in a reversed order. For example, a codepoint '1' corresponds to a triggering state at the last position, and a codepoint '2' corresponds to a triggering state at the last but one position.

Similarly, first configuration information for semi-persistent reporting contains a list, i.e., a CSI-SemiPersistentOnPUSCH-TriggerStateList. A correspondence relation between codepoints and triggering states is determined based on the order of positions of the triggering states in the list. For example, a codepoint '1' corresponds to a triggering state at a first position, a codepoint '2' corresponds to a triggering state at a second position, and so forth. Alternatively, the correspondence relation is defined in a reversed order. For example, a codepoint '1' corresponds to a triggering state at the last position, and a codepoint '2' corresponds to a triggering state at the last but one position.

Approach 4: when the first configuration information is configuration information for semi-persistent reporting, configuration information of each semi-persistent triggering state in the first configuration information includes a reporting configuration ID, and the reporting configuration ID corresponds to a codepoint of the first information field.

In an implementation, reporting configuration IDs correspond in an ascending order to codepoints of the first information field.

In another implementation, the reporting configuration IDs correspond in a descending order to the codepoints of the first information field.

In a specific implementation, RRC signalling carrying first configuration information may keep unchanged, and a triggering state is determined implicitly by a reporting configuration ID (i.e., a CSI-ReportConfigId) corresponding to the triggering state. In particular, for semi-persistent reporting, each of the at least one triggering state is configured with only one CSI-ReportConfigId (i.e., an ID corresponding to CSI reporting configuration), and the CSI-ReportConfigId directly corresponds to a codepoint of the CSI request field. A correspondence relation between codepoints and triggering states is determined based on the order of CSI-ReportConfigIds corresponding to the triggering states. For example, a codepoint '0' corresponds to a minimum CSI-ReportConfigId, and a codepoint '1' corresponds to a second minimum CSI-ReportConfigId. Alternatively, the correspondence relation is defined in a reversed order. For example, a codepoint '0' corresponds to a maximum CSI-ReportConfigId, and a codepoint '1' corresponds to a second maximum CSI-ReportConfigId.

Figure 4:
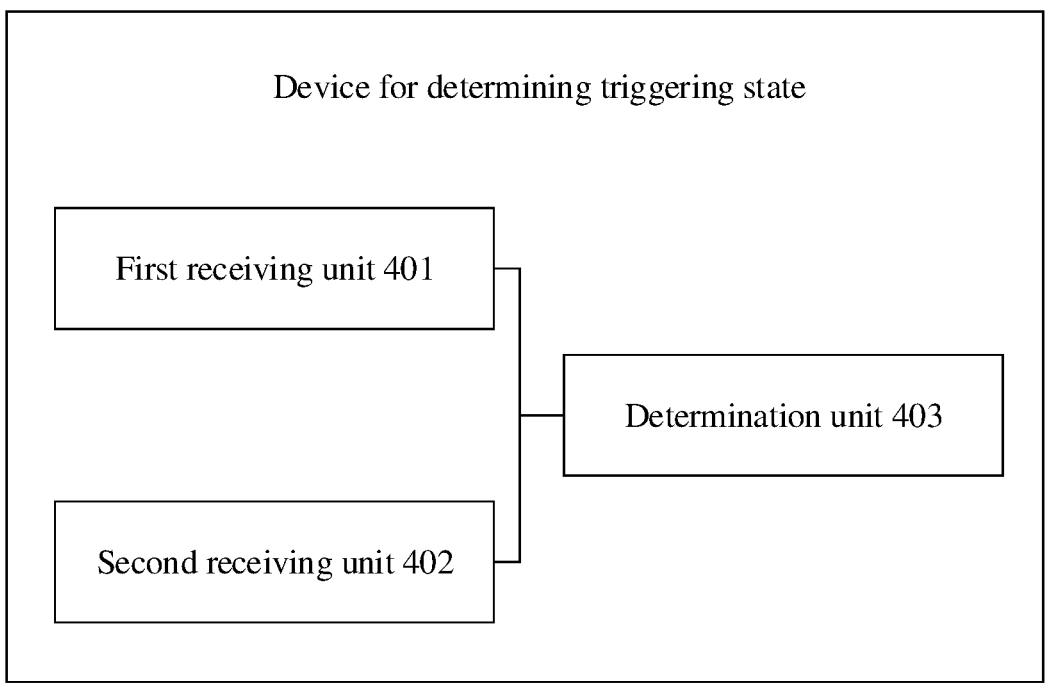
FIG. 4 illustrates a first schematic diagram of structural composition of a device for determining a triggering state according to some embodiments of the disclosure.

FIG. 4 illustrates a first schematic diagram of structural composition of a device for determining a triggering state according to some embodiments of the disclosure. As illustrated in FIG. 4, the device includes a first receiving unit 401, a second receiving unit 402 and a determination unit 403.

The first receiving unit 401 is configured to receive first configuration information from a network device. The first configuration information includes configuration information of at least one triggering state.

The second receiving unit 402 is configured to receive first control information from the network device. The first control information includes a first information field.

The determination unit 402 is configured to determine, based on a codepoint of the first information field, a first triggering state identification (ID), and determine, based on the first triggering state ID, a corresponding first triggering state in the first configuration information. Or, the determination unit 402 is configured to determine, based on the codepoint of the first information field, the first triggering state at a target position in the first configuration information.

In an implementation, configuration information of each of the at least one triggering state in the first configuration information includes a second information field. The second information field indicates a triggering state ID of the triggering state.

In an implementation, when the first configuration information is configuration information for aperiodic reporting, configuration information of each aperiodic triggering state includes the second information field. The second information field indicates a triggering state ID of the aperiodic triggering state.

Or, when the first configuration information is configuration information for semi-persistent reporting, configuration information of each semi-persistent triggering state includes the second information field. The second information field indicates a triggering state ID of the semi-consistent triggering state.

In an implementation, a position of each of the at least one triggering state in the first configuration information corresponds to a triggering state ID of the triggering state.

In an implementation, when the first configuration information is configuration information for aperiodic reporting, a position of each aperiodic triggering state in the first configuration information corresponds to a triggering state ID of the aperiodic triggering state.

Or, when the first configuration information is configuration information for semi-persistent reporting, a position of each semi-persistent triggering state in the first configuration information corresponds to a triggering state ID of the semi-persistent triggering state.

In an implementation, a position of each of the at least one triggering state in the first configuration information corresponds to a triggering state ID of the triggering state, in an event that: triggering state IDs of triggering states in the first configuration information are sorted in an ascending order from a first position to a last position for the triggering states; or the triggering state IDs of the triggering states in the first configuration information are sorted in a descending order from the first position to the last position for the triggering states.

In an implementation, a position of each of the at least one triggering state in the first configuration information corresponds to a codepoint of the first information field.

In an implementation, when the first configuration information is configuration information for aperiodic reporting, a position of each aperiodic triggering state in the first configuration information corresponds to a codepoint of the first information field.

Or, when the first configuration information is configuration information for semi-persistent reporting, a position of each semi-persistent triggering state in the first configuration information corresponds to a codepoint of the first information field.

In an implementation, a position of each of the at least one triggering state in the first configuration information corresponds to a codepoint of the first information field in an event that: codepoints of the first information field correspond in an ascending order to triggering states from a first position to a last position for the triggering states in the first configuration information; or the codepoints of the first information field correspond in a descending order to triggering states from the first position to the last position for the triggering states in the first configuration information.

In an implementation, when the first configuration information is configuration information for semi-persistent reporting, configuration information of each semi-persistent triggering state in the first configuration information includes a reporting configuration ID, and the reporting configuration ID corresponds to a codepoint of the first information field.

In an implementation, the reporting configuration information corresponds to a codepoint of the first information field in an event that: reporting configuration IDs correspond in an ascending order to codepoints of the first information field; or the reporting configuration IDs correspond in a descending order to the codepoints of the first information field.

Those skilled in the art should understand that description related to the device for determining a triggering state according to embodiments of the disclosure can be comprehend with reference to the description related to the method for determining a triggering state according to embodiments of the disclosure.

Figure 5:
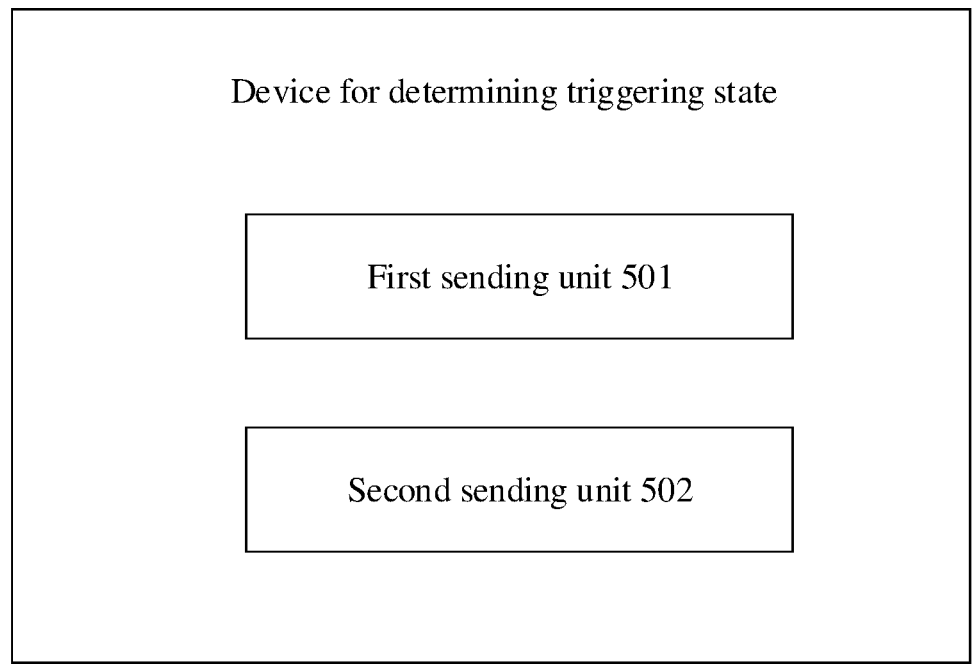
FIG. 5 illustrates a second schematic diagram of structural composition of a device for determining a triggering state according to some embodiments of the disclosure.

FIG. 5 illustrates a second schematic diagram of structural composition of a device for determining a triggering state according to some embodiments of the disclosure. As illustrated in FIG. 5, the device includes a first sending unit 501 and a second sending unit 502.

The first sending unit 501 is configured to send first configuration information to a terminal device. The first configuration information includes configuration information of at least one triggering state.

The second sending unit 502 is configured to send first control information to the terminal device. The first control information includes a first information field.

A codepoint of the first information field is used for the terminal device to determine a first triggering state identification (ID), and to determine, based on the first triggering state ID, a corresponding first triggering state in the first configuration information; or the codepoint of the first information field is used for the terminal device to determine the first triggering state at a target position in the first configuration information.

In an implementation, configuration information of each of the at least one triggering state in the first configuration information includes a second information field. The second information field indicates a triggering state ID of the triggering state.

In an implementation, when the first configuration information is configuration information for aperiodic reporting, configuration information of each aperiodic triggering state includes the second information field. The second information field indicates a triggering state ID of the aperiodic triggering state; or when the first configuration information is configuration information for semi-persistent reporting, configuration information of each semi-persistent triggering state includes the second information field. The second information field indicates a triggering state ID of the semi-consistent triggering state.

In an implementation, a position of each of the at least one triggering state in the first configuration information corresponds to a triggering state ID of the triggering state.

In an implementation, when the first configuration information is configuration information for aperiodic reporting, a position of each aperiodic triggering state in the first configuration information corresponds to a triggering state ID of the aperiodic triggering state.

Or, when the first configuration information is configuration information for semi-persistent reporting, a position of each semi-persistent triggering state in the first configuration information corresponds to a triggering state ID of the semi-persistent triggering state.

In an implementation, a position of each of the at least one triggering state in the first configuration information corresponds to a triggering state ID of the triggering state in an event that: triggering state IDs of triggering states in the first configuration information are sorted in an ascending order from a first position to a last position for the triggering states; or the triggering state IDs of the triggering states in the first configuration information are sorted in a descending order from the first position to the last position for the triggering states.

In an implementation, a position of each of the at least one triggering state in the first configuration information corresponds to a codepoint of the first information field.

In an implementation, when the first configuration information is configuration information for aperiodic reporting, a position of each aperiodic triggering state in the first configuration information corresponds to a codepoint of the first information field.

Or, when the first configuration information is configuration information for semi-persistent reporting, a position of each semi-persistent triggering state in the first configuration information corresponds to a codepoint of the first information field.

In an implementation, a position of each of the at least one triggering state in the first configuration information corresponds to a codepoint of the first information field in an event that: codepoints of the first information field correspond in an ascending order to triggering states from a first position to a last position for the triggering states in the first configuration information; or the codepoints of the first information field correspond in a descending order to triggering states from the first position to the last position for the triggering states in the first configuration information.

In an implementation, when the first configuration information is configuration information for semi-persistent reporting, configuration information of each semi-persistent triggering state in the first configuration information includes a reporting configuration ID, and the reporting configuration ID corresponds to a codepoint of the first information field.

In an implementation, the reporting configuration information corresponds to a codepoint of the first information field in an event that: reporting configuration IDs correspond in an ascending order to codepoints of the first information field; or the reporting configuration IDs correspond in a descending order to the codepoints of the first information field.

Those skilled in the art should understand that description related to the device for determining a triggering state according to embodiments of the disclosure can be comprehend with reference to the description related to the method for determining a triggering state according to embodiments of the disclosure.

Figure 6:
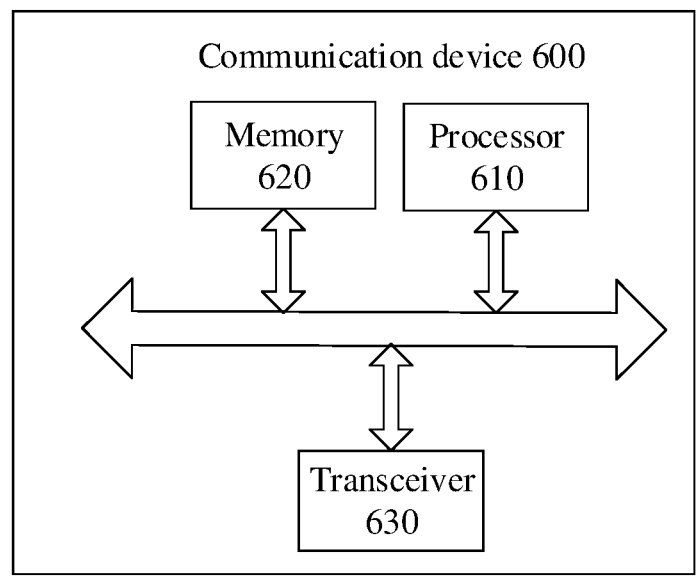
FIG. 6 illustrates a schematic structural diagram of a communication device according to some embodiments of the disclosure.

FIG. 6 illustrates a schematic structural diagram of a communication device 600 according to some embodiments of the disclosure. The communication device may be a terminal device or a network device. The communication device 600 as illustrated in FIG. 6 includes a processor 610. The processor 610 can call and run a computer program from a memory, to implement the method according to the embodiments of the disclosure.

As illustrated in FIG. 6, the communication device 600 may further include a memory 620. The processor 610 can call and run a computer program from the memory 620, to implement the method according to the embodiments of the disclosure.

The memory 620 may be a separate device independent from the processor 610, or may be integrated into the processor 610.

As illustrated in FIG. 6, the communication device 600 may further include a transceiver 630. The processor 610 may control the transceiver 630 to communicate with another device, particularly, sending information or data to another device or receiving information or data from another device.

The transceiver 630 may include a transmitter and a receiver. The transceiver 630 may further include one or more antennas.

The communication device 600 may specifically be the network device according to the embodiments of the disclosure. The communication device 600 may implement corresponding processes implemented by the network device in each method according to the embodiments of the disclosure, which will not be described here for simplicity.

The communication device 600 may specifically be a mobile terminal/terminal device according to the embodiments of the disclosure. The communication device 600 may implement corresponding processes implemented by the mobile terminal/terminal device in each method according to the embodiments of the disclosure, which will not be described here for simplicity.

Figure 7:
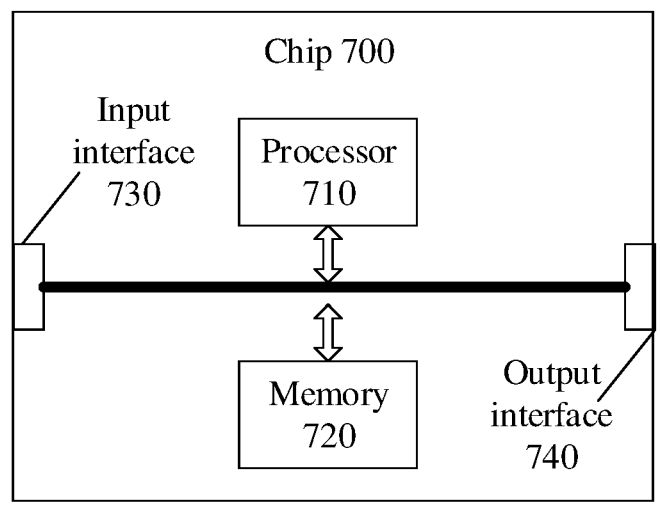
FIG. 7 illustrates a schematic structural diagram of a chip according to some embodiments of the disclosure.

FIG. 7 illustrates a schematic structural diagram of a chip according to some embodiments of the disclosure. The chip as illustrated in FIG. 7 includes a processor 710. The processor 710 can call and run a computer program from the memory, to implement the method according to the embodiments of the disclosure.

As illustrated in FIG. 7, the chip 700 may further include a memory 720. The processor 710 can call and run a computer program from the memory 720, to implement the method according to the embodiments of the disclosure.

The memory 720 may be a separate device independent from the processor 710, or may be integrated into the processor 710.

The chip 700 may further include an input interface 730. The processor 710 may control the input interface 730 to communicate with another device or chip, particularly, may acquire information or data from another device or chip.

The chip 700 may further include an output interface 740. The processor 710 may control the output interface 740 to communicate with another device or chip, particularly, may output information or data to another device or chip.

The chip may be applied to the network device according to the embodiments of the disclosure. The chip may implement corresponding processes implemented by the network device in each method according to the embodiments of the disclosure, which will not be described here for simplicity.

The chip may be applied to a mobile terminal/terminal device according to the embodiments of the disclosure. The chip may implement corresponding processes implemented by the mobile terminal/terminal device in each method according to the embodiments of the disclosure, which will not be described here for simplicity.

It is to be understood that the chip described to the embodiments of the disclosure may also be called a system-level chip, a system chip, a chip system, a system on chip or the like.

Figure 8:
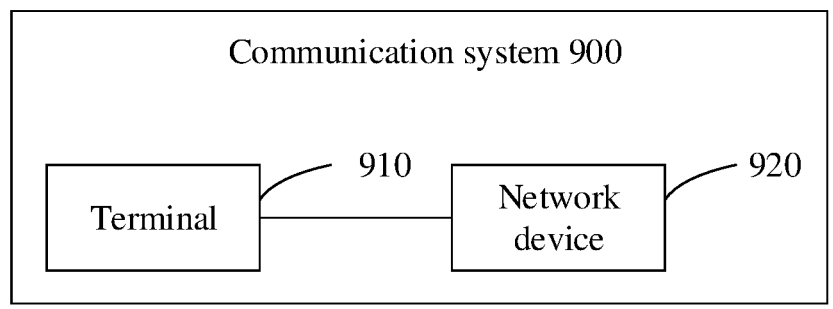
FIG. 8 illustrates a schematic block diagram of a communication system according to some embodiments of the disclosure.

FIG. 8 illustrates a schematic block diagram of a communication system 900 provided according to some embodiments of the disclosure. As illustrated in FIG. 8, the communication system 900 includes a terminal device 910 and a network device 920.

The terminal device 910 may be used for implementing corresponding functions implemented by a terminal device in the above method, and the network device 920 may be used for implementing corresponding functions implemented by a network device in the above method, which will not be described here for simplicity.

It is to be understood that the processor in the embodiments of the disclosure may be an integrated circuit chip, and has a signal processing capability. During implementation, each of the method embodiment above may be implemented by an integrated logic circuit of hardware or instructions in a software form in the processor. The processor above may be a general-purpose processor, a digital signal processor (DSP), an application specific integrated circuit (ASIC), a field programmable gate array (FPGA) or other programmable logic devices, transistor logic devices, discrete hardware components, etc. The processor can realize or execute the method, steps and logical block diagrams disclosed in the embodiments of the disclosure. The general-purpose processor may be a microprocessor, or the processor may be any ordinary processor. The actions of the method disclosed in conjunction with the embodiments of the disclosure may be directly embodied to be accomplished by a hardware decoding processor, or by a combination of hardware and software modules in the decoding processor. The software module may be located in a storage medium mature in the related art, such as a random memory, a flash, a read-only memory, a programmable read-only memory or an electrically erasable programmable read-only memory, and a register. The storage medium is a memory, and the processor reads information in the memory and completes steps of the above method in combination with hardware.

It is to be understood that, in the embodiments of the disclosure, the memory may be a volatile memory or a non-volatile memory, or includes both a volatile and non-volatile memories. The non-volatile memory may be a read-only memory (ROM), a programmable ROM (PROM), an erasable PROM (EPROM), an electrically EPROM (EEPROM) or a flash. The volatile memory may be a random access memory (RAM), and is used as an external cache. By exemplary but not limiting description, many types of RAMs are available, a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM) and a direct rambus RAM (DR RAM). It is to be noted that, the memory in the system and method described herein are intended to include but are not limited to these and any other suitable type of memories.

It is to be understood that the description of the memory is exemplary but not limiting. By way of example, the memory in the embodiments of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM) and a direct rambus RAM (DR RAM). That is to say, the memory in the embodiments of the disclosure are intended to include but are not limited to these and any other suitable type of memories.

A computer-readable storage medium for storing a computer program is further provided in embodiments of the disclosure.

The computer-readable storage medium may be applied to the network device according to the embodiments of the disclosure. The computer-readable storage medium may implement corresponding processes implemented by the network device in each method according to the embodiments of the disclosure, which will not be described here for simplicity.

The computer-readable storage medium may be applied to a mobile terminal/terminal device according to the embodiments of the disclosure. The computer program enables a computer to implement corresponding processes implemented by the mobile terminal/terminal device in each method according to the embodiments of the disclosure, which will not be described here for simplicity.

A computer program product including computer program instructions is further provided in embodiments of the disclosure.

The computer program product may be applied to the network device according to the embodiments of the disclosure. The computer program instructions enable a computer implement corresponding processes implemented by the network device in each method according to the embodiments of the disclosure, which will not be described here for simplicity.

The computer program product may be applied to the mobile terminal/terminal device according to the embodiments of the disclosure. The computer program instructions enable a computer to implement corresponding processes implemented by the mobile terminal/terminal device in each method according to the embodiments of the disclosure, which will not be described here for simplicity.

A computer program is further provided in embodiments of the disclosure.

The computer program may be applied to the network device according to the embodiments of the disclosure. The computer program, when running on a computer, enables the computer to implement corresponding processes implemented by the network device in each method according to the embodiments of the disclosure, which will not be described here for simplicity.

The computer program may be applied to the mobile terminal/terminal device according to the embodiments of the disclosure. The computer program, when running on a computer, enables the computer to implement corresponding processes implemented by the mobile terminal/terminal device in each method according to the embodiments of the disclosure, which will not be described here for simplicity.

It may be appreciated by those of ordinary skilled in the art that units and algorithm steps in each example described in combination with the embodiments disclosed herein may be implemented by electronic hardware, or a combination of computer software and electronic hardware. Whether these functions are implemented in the form of hardware or software depends on specific application of the technical solution and constraint conditions in design. The professionals may implement the described functions in different ways for each specific application, but such implementation should not be construed beyond the scope of the disclosure.

Those skilled in the art may clearly understand that the particular operation of the system, device and units described above may refer to the corresponding operations in the method embodiment above, which will not be described here, for convenience and simplicity of description.

In the embodiments provided, it is to be understood that the disclosed system, device and method may be embodied in other ways. For example, the device embodiment described above is merely exemplarily. For example, the division of units is merely division of logical functions, and the units may be divided in other ways in practical implementation. For example, multiple units or components may be combined or integrated into another system, or some features may be neglected or not executed. Additionally, the displayed or discussed mutual coupling or direct coupling or communication connection may be implemented through some interfaces, and indirect coupling or communication connections between devices or units may be electrical, mechanical or other forms.

Units described as separate parts therein may or may not be physically separated, and parts displayed as units may or may not be physical units, and namely may be located in the same place or may also be distributed to multiple network units. Some or all of the units may be selected according to a practical requirement to achieve the purpose of the solutions of the embodiments.

Furthermore, in the embodiments of the disclosure, various functional units may be integrated into a processing unit, or each unit may exist alone physically, or two or more units may be integrated into one unit.

When being implemented in form of software functional unit and sold or used as an independent product, the functions may be stored in a computer-readable memory. Based on such an understanding, the technical solutions of the disclosure substantially or parts making contributions to the related art or all or part of the technical solutions may be embodied in form of software product, and the computer software product is stored in a memory, including a plurality of instructions configured to enable a computer device (which may be a personal computer, a server, network device or the like) to execute all or part of the actions of the method in each embodiment of the disclosure. The storage medium above includes various media capable of storing program codes such as a U disk, a read-only memory (ROM), a random access memory (RAM), a mobile hard disk, a magnetic disk or an optical disk.

The above are only detailed description of the disclosure, but the scope of protection of the disclosure is not limited to this. Changes or replacements that would come up to those skilled in the art should fall within the coverage of the disclosure. Therefore, the scope of protection of the disclosure should be defined by the claims.

The invention claimed is:

1. A method for determining a triggering state, comprising:
sending, by a network device, first configuration information to a terminal device, wherein the first configuration information is radio resource control (RRC) signalling for configuring a CSI-SemiPersistentOnPUSCH-TriggerStateList, and the first configuration information comprises configuration information of at least one triggering state; and
sending, by the network device, downlink control information (DCI) to the terminal device, wherein the DCI comprises a channel state information (CSI) request field,
wherein a codepoint of the CSI request field is used for the terminal device to determine the first triggering state at a target position in the first configuration information, and
wherein a position of each of the at least one triggering state in the first configuration information corresponds to a codepoint of the CSI request field, a starting codepoint of the CSI request field corresponding to a triggering state is 0, and codepoints of the CSI request field correspond in an ascending order to triggering states from a first position to a last position for the triggering states in the first configuration information.

2. The method according to claim 1, wherein the configuration information of each of the at least one triggering state in the first configuration information comprises a second information field, and the second information field indicates a triggering state ID of the triggering state.

3. The method according to claim 2, wherein the first configuration information further comprises the second information field, wherein the second information field indicates a triggering state ID of the semi-consistent triggering state.

4. A network device, comprising: a processor, a transceiver and a memory for storing a computer program, wherein the processor is configured to call and execute the computer program stored in the memory, to:
send first configuration information to a terminal device, wherein the first configuration information is radio resource control (RRC) signalling for configuring a CSI-SemiPersistentOnPUSCH-TriggerStateList, and the first configuration information comprises configuration information of at least one triggering state; and
send downlink control information (DCI) to the terminal device, wherein the DCI comprises a channel state information (CSI) request field,
wherein a codepoint of the CSI request field is used for the terminal device to determine the first triggering state at a target position in the first configuration information, and
wherein a position of each of the at least one triggering state in the first configuration information corresponds to a codepoint of the CSI request field, a starting codepoint of the CSI request field corresponding to a triggering state is 0, and codepoints of the CSI request field correspond in an ascending order to triggering states from a first position to a last position for the triggering states in the first configuration information.

5. The network device according to claim 4, wherein the configuration information of each of the at least one triggering state in the first configuration information comprises a second information field, wherein the second information field indicates a triggering state ID of the triggering state.

6. The network device according to claim 5, wherein the first configuration information further comprises the second information field, wherein the second information field indicates a triggering state ID of the semi-consistent triggering state.

* * * * *